United States Patent [19]

Ishii et al.

[11] Patent Number: 4,576,734
[45] Date of Patent: Mar. 18, 1986

[54] STABILIZER FOR SYNTHETIC RESINS

[75] Inventors: Tamaki Ishii, Suita; Shinichi Yachigo, Toyonaka; Manji Sasaki, Ibaraki; Masahisa Shionoya, Izumi; Haruki Okamura, Osaka, all of Japan

[73] Assignee: Sumitomo Chemical Company, Limited, Osaka, Japan

[21] Appl. No.: 712,230

[22] Filed: Mar. 15, 1985

[30] Foreign Application Priority Data

Mar. 19, 1984 [JP] Japan .................. 59-53186

[51] Int. Cl.$^4$ ................ C09K 15/14; C08K 5/11
[52] U.S. Cl. .................... 252/404; 252/406; 560/75; 524/108; 524/302
[58] Field of Search ............... 252/404, 406; 524/108, 524/302; 560/75

[56] References Cited

U.S. PATENT DOCUMENTS

| | | | |
|---|---|---|---|
| 3,347,871 | 10/1967 | Harding | 252/404 X |
| 3,388,098 | 6/1968 | Harding | 524/108 X |
| 3,644,482 | 2/1972 | Dexter et al. | 560/75 |
| 3,758,549 | 9/1973 | Dexter et al. | 560/151 |
| 3,966,675 | 6/1976 | Schurdak et al. | 524/100 |
| 4,267,358 | 5/1981 | Hechenbleikner et al. | 560/75 |
| 4,405,737 | 9/1983 | Hirai et al. | 252/404 X |
| 4,501,838 | 2/1985 | Hechenbleikner et al. | 524/108 |

FOREIGN PATENT DOCUMENTS

| | | | |
|---|---|---|---|
| 102193 | 3/1984 | European Pat. Off. | 252/404 |
| 185330 | 11/1982 | Japan . | |
| 185331 | 11/1982 | Japan . | |
| 185332 | 11/1982 | Japan | 524/108 |
| 20337 | 2/1984 | Japan . | |

OTHER PUBLICATIONS

Chemical Abstract, 101:8213w "Stabilizers for Plastics" JP 59/25,826, (1984) pp. 38-39.

Primary Examiner—John F. Terapane
Assistant Examiner—M. A. Thexton
Attorney, Agent, or Firm—Wenderoth, Lind & Ponack

[57] ABSTRACT

A stabilizer for synthetic resins containing as an effective component a mixture comprising a phenol type compound (I) represented by the formula (I),

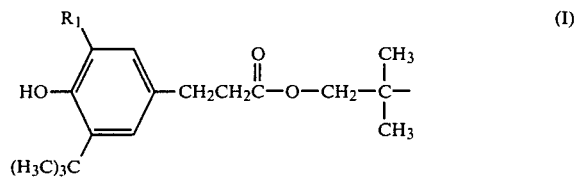

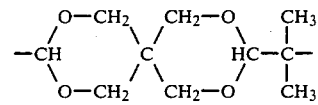

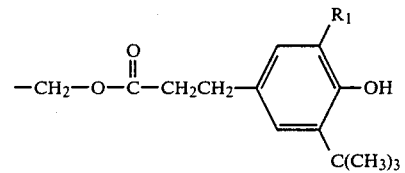

wherein $R_1$ represents a $C_1$-$C_3$ alkyl group, and at least one sulfur type compound (II) selected from the group consisting of compounds represented by the formula (II-1),

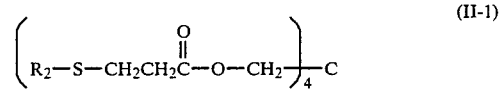

wherein $R_2$ represents a $C_4$-$C_{20}$ alkyl group, and compounds represented by the formula (II-2),

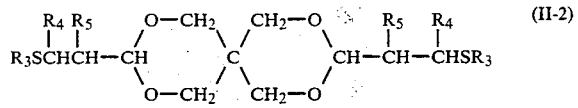

wherein $R_3$ represents a $C_3$-$C_{18}$ alkyl group, and $R_4$ and $R_5$ independently represent a hydrogen atom or a $C_1$-$C_6$ alkyl group, the weight ratio of phenol type compound (I) to sulfur type one (II) being 1 to 0.5-15.

7 Claims, No Drawings

STABILIZER FOR SYNTHETIC RESINS

The present invention relates to a stabilizer for synthetic resins giving excellent stability to synthetic resins.

Various kinds of synthetic resin such as polyolefins (e.g. polyethylene, polypropylene), styrene type synthetic resins (e.g. polystyrene, impact-resistant polystyrene, ABS), engineering plastics (e.g. polyacetal, polyamide), polyurethane, etc. are widely used in various fields. It is however well known that when these synthetic resins are used alone, their stability becomes a problem, for example they deteriorate by the action of heat, light and oxygen on processing or use, thereby showing a remarkable reduction in mechanical properties accompanied by phenomena such as softening, embrittlement, surface crack, discoloration and the like.

It is also hitherto well known that, in order to solve this problem, various kinds of phenol, phosphite and sulfur type antioxidants are added or used in the course of production and processing of synthetic resins. For example, it is well known that phenol type antitoxidants such as 2,6-di-tert-butyl-4-methylphenol, 2,2'-methylenebis(4-methyl-6-tert-butylphenol), 4,4'-butylidenebis(3-methyl-6-tert-butylphenol), n-octadecyl 3-(3,5-di-tert-butyl-4-hydroxyphenyl)propionate, 1,1,3-tris(2-methyl-4-hydroxy-5-tert-butylphenyl)butane, pentaerythritorl tetrakis[3-(3,5-di-tert-butyl-4-hydroxyphenyl)propionate] and the like are used alone, or these phenol type antioxidants are used in combination with phosphite type antioxidants such as tris(nonylphenyl)phosphite, distearyl pentaerythritol diphosphite and the like, or sulfur type antioxidants such as dilauryl thiodipropionate, dimyristyl thiodipropionate, distearyl thiodipropionate and the like.

But, this method is not yet well satisfactory in terms of thermal and oxidation stability, thermal discoloration resistance, sublimation and the like.

Also, a stabilizer comprising pentaerythritol tetrakis[3-(3,5-dialkyl-4-hydroxyphenyl)propionate] and pentaerythritol tetrakis(3-alkylthiopropionate) is proposed in Japanese Patent Application Kokai (Laid-open) No. 20337/1984. This stabilizer is fairly superior to the conventional ones, but it is not always well satisfactory in terms of the thermal and oxidation stability, thermal discoloration resistance, etc. so that there has been a demand for the appearance of stabilizers of higher performance.

The present inventors extensively studied to solve these problems, and as a result, found that a mixture comprising a particular phenol type and particular sulfur type compounds in a particular proportion gives synthetic resins excellent thermal and oxidation stability which can never be forecast from the conventional antioxidant-combination technique. The present inventors thus attained to the present invention.

An object of the present invention is to provide a stabilizer for synthetic resins containing as an effective component a mixture comprising a phenol type compound (I) represented by the formula (I),

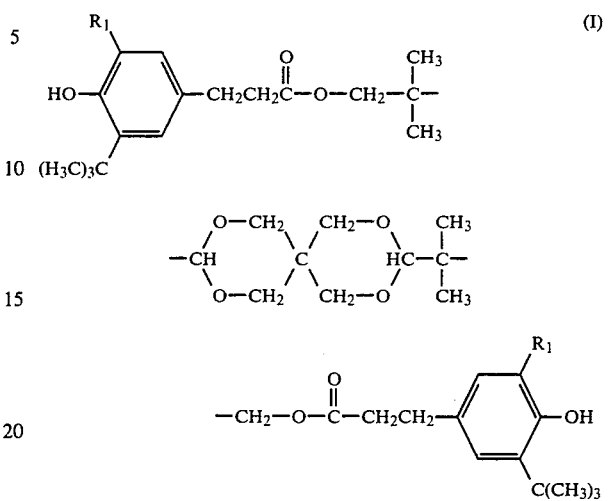

wherein $R_1$ represents a $C_1$–$C_3$ alkyl group, and at least one sulfur type compound (II) selected from the group consisting of compounds represented by the formula (II-1), $$\left( R_2-S-CH_2CH_2\overset{O}{\underset{\|}{C}}-O-CH_2\right)_{\!4}\!\!C \quad \text{(II-1)}$$

wherein $R_2$ represents a $C_4$–$C_{20}$ alkyl group, and compounds represented by the formula (II-2),

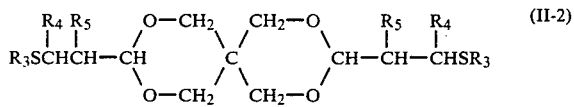

wherein $R_3$ represents a $C_1$–$C_{18}$ alkyl group, and $R_4$ and $R_5$ independently represent a hydrogen atom or $C_3$–$C_6$ alkyl group, the weight ratio of phenol type compound (I) to sulfur type one (II) being 1 to 0.5–15.

The phenol type compound of the foregoing formula (I) used in the present invention can be produced by the common ester interchange reaction of 3,9-bis(2-hydroxy-1,1-dimethylethyl)-2,4,8,10-tetraoxaspiro[5.5]undecane with 3-(3-alkyl-5-tert-butyl-4-hydroxyphenyl)propionic acid, its acid halide, acid anhydride or lower alkyl ester.

In the phenol type compound represented by the formula (I), $R_1$ represents a methyl, ethyl or propyl group, but a methyl group is preferred in terms of the thermal and oxidation stability.

In the compounds represented by the formula (II-1), a substituent $R_2$ is preferably a $C_6$–$C_{18}$ alkyl group, most preferably a dodecyl group in terms of the thermal and oxidation stability.

Typical examples of such compound are shown in Table 1.

TABLE 1

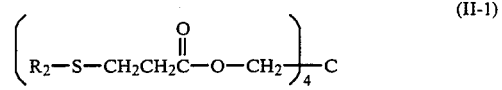

| Compound No. | $R_2$ |
|---|---|
| II-1-1 | —$C_6H_{13}$ |
| II-1-2 | —$C_{12}H_{25}$ |
| II-1-3 | —$C_{18}H_{37}$ |

In the compounds represented by the formula (II-2), a substituent $R_3$ is preferably a $C_8$–$C_{18}$ alkyl group and substituents $R_4$ and $R_5$ are preferably a hydrogen atom or a $C_1$–$C_3$ alkyl group in terms of the thermal and oxidation stability.

Typical examples of such compound are shown in Table 2.

TABLE 2

$$R_3SCHCH\begin{array}{c}R_4\ R_5\\|\ |\\-CH\end{array}\begin{array}{c}O-CH_2\\ \diagup\ \diagdown\\ \diagdown\ \diagup\\O-CH_2\end{array}C\begin{array}{c}CH_2-O\\ \diagup\ \diagdown\\ \diagdown\ \diagup\\CH_2-O\end{array}CH\begin{array}{c}R_5\ R_4\\|\ |\\-CHCHSR_3\end{array}$$

| Compound No. | $R_3$ | $R_4$ | $R_5$ |
|---|---|---|---|
| II-2-1 | —$C_8H_{17}$ | —$CH_3$ | —H |
| II-2-2 | —$C_{12}H_{25}$ | —$C_4H_9$ | —H |
| II-2-3 | —$C_{12}H_{25}$ | —$CH_3$ | —H |
| II-2-4 | —$C_{18}H_{37}$ | —$CH_3$ | —H |
| II-2-5 | —$C_{12}H_{25}$ | —H | —H |
| II-2-6 | —$C_{18}H_{37}$ | —H | —$CH_3$ |

The stabilizer for synthetic resins of the present invention comprises, as described above, a mixture of a phenol type compound (I) represented by the foregoing formula (I) and at least one sulfur type compound (II) selected from compounds represented by the formulae (II-1) and (II-2), and the mixing ratio of phenol type compound (I) to sulfur type compound (II) is 1 to 0.5–15, preferably 1 to 1–10, more preferably 1 to 2–6 in weight ratio.

When the weight ratio of sulfur type compound (II) to phenol type one (I) is less than 0.5, the intended effect is difficult to sufficiently obtain. Even if the weight ratio exceeds 15, a sufficient effect enough to correspond to that ratio is difficult to obtain, which becomes also disadvantageous economically.

In using the stabilizer for synthetic resins of the present invention, the amount of the stabilizer blended with synthetic resins is generally 0.01 to 5 parts by weight, preferably 0.05 to 1 part by weight based on 100 parts by weight of the synthetic resin. In using the stabilizer, the phenol type compound (I) and sulfur type one (II) may separately be blended with the synthetic resin without mixing the both compounds in advance.

For blending the stabilizer with synthetic resins, the well-known apparatus and methods for incorporating stabilizers, pigments, fillers, etc. in synthetic resins may be used almost as such.

In applying the stabilizer for synthetic resins of the present invention, other additives such as ultraviolet absorbers, light stabilizers, antioxidants, metal deactivators, metal soaps, nucleating agents, lubricants, antistatic agents, flame retardants, pigments, fillers and the like may be used together with said stabilizer.

Particularly, the light fastness of synthetic resins can be improved by using ultraviolet absorbers, hindered amine type light stabilizers, etc. such as 2-hydroxy-4-methoxybenzophenone, 2-hydroxy-4-n-octoxybenzophenone, 2-(2-hydroxy-5-methylphenyl)benzotriazole, 2-(2-hydroxy-3-tert-butyl-5-methylphenyl)-5-chlorobenzotriazole, 2-(2-hydroxy-3,5-di-tert-butylphenyl)-5-chlorobenzotriazole, 2-(2-hydroxy-3,5-diamylphenyl)benzotriazole, [2,2'-thiobis(4-tert-octylphenolate)]-butylamine nickel complex, 2,2,6,6-tetramethyl-4-piperidyl benzoate, bis(2,2,6,6-tetramethyl-4-piperidyl)sebacate, bis(1,2,2,6,6-pentamethyl-4-piperidyl) 2-(3,5-di-tert-butyl-4-hydroxybenzyl)-2-n-butylmalonate, 1-[2-{3-(3,5-di-tert-butyl-4-hydroxyphenyl)propionyloxy}ethyl]-4-[3-(3,5-di-tert-butyl-4-hydroxyphenyl)propionyloxy]-2,2,6,6-tetramethylpiperidine, dimethyl succinate, 1-(2-hydroxyethyl)-4-hydroxy-2,2,6,6-tetramethylpiperidine polycondensation product, a reaction product of dihaloalkylene with N,N'-bis(2,2,6,6-tetramethyl-4-piperidyl)alkylenediamine, a reaction product of 2,6-dichloro-1,3,5-triazine with N,N'-bis(2,2,6,6-tetramethyl-4-piperidyl)alkylenediamine, etc. together with the stabilizer of the present invention.

Also, the color of synthetic resins can be improved by adding a phosphite type antioxidant. This antioxidant includes for example distearyl pentaerythritol diphosphite, tris(2,4-di-tert-butylphenyl)phosphite, tris(2-tert-butyl-4-methylphenyl)phosphite, bis(2,4-di-tert-butylphenyl)pentaerythritol diphosphite, tetrakis(2,4-di-tert-butylphenyl)-4,4'-biphenylene diphosphite and the like.

Thus, by using the stabilizer for synthetic resins of the present invention, the stability of synthetic resins is markedly improved. As such synthetic resins, there are given for example low-density polyethylene, high-density polyethylene, linear low-density polyethylene, chlorinated polyethylene, EVA resin, polypropylene, polyvinyl chloride, methacrylic resin, polystyrene, impact-resistant polystyrene, ABS resin, AES resin, MBS resin, polyethylene terephthalate, polybutylene terephthalate, polyamide, polyimide, polycarbonate, polyacetal, polyurethane, unsaturated polyester resin and the like. The stabilizer of the present invention is particularly effective on polypropylene.

Next, the present invention will be illustrated in detail with reference to the following examples, which are not however to be interpreted as limiting the invention thereto.

PRODUCTION EXAMPLE 1

(Production of the compound I-1)

0.82 Gram (0.015 mole) of sodium methoxide was added to a mixture of 30.2 g (0.121 mole) of methyl 3-(3-tert-butyl-4-hydroxy-5-methylphenyl)propionate and 15.3 g (0.0503 mole) of 3,9-bis(2-hydroxy-1,1-dimethylethyl)-2,4,8,10-tetraoxaspiro[5.5]undecane, and the whole mixture was heated. After carrying out reaction at 140° C. for 3 hours, the reaction was continued for further 7 hours at 140° to 160° C. under a reduced pressure of 50 mmHg.

After completion of the reaction, the reaction product was dissolved in toluene, and the toluene solution was washed with a dilute aqueous hydrochloric acid and then with water. Thereafter, toluene was removed by evaporation under reduced pressure to obtain 42.9 g of a crude product of 77% in purity. The product was purified by column chromatography on silica gel to obtain 24 g of a 99%-purity, colorless and glassy product, 3,9-bis[2-{3-(3-tert-butyl-4-hydroxy-5-methylphenyl)propionyloxy}-1,1-dimethylethyl]-2,4,8,10-tetraoxaspiro[5.5]undecane (compound I-1).

m.p. 45°–55° C.

Elementary analysis (for $C_{43}H_{64}O_{10}$): Found: C, 69.61% H, 8.98%. Calculated: C, 69.70%; H, 8.71%.

Mass analytical value (FD-mass): Molecular ion peak 740.

Proton NMR (CDCl$_3$/TMS): δ(ppm) 0.92(12H s), 1.40(18H s), 2.21(6H s), 2.7(8H m), 3.4(8H m), 3.93(4H s), 4.17(2H s), 4.67(2H broad s), 6.85(2H board s), 6.96(2H broad s).

PRODUCTION EXAMPLE 2

(Compound I-2)

A mixture of 33.6 g (0.121 mole) of methyl 3-(3-tert-butyl-4-hydroxy-5-isopropylphenyl)propionate, 15.3 g (0.0503 mole of 3,9-bis(2-hydroxy-1,1-dimethylethyl)-

2,4,8,10-tetraoxaspiro[5.5]undecane and 0.82 g (0.015 mole) of sodium methoxide was reacted, after-treated and purified in the same manner as in Production example 1 to obtain 29 g of a 98%-purity, colorless and glassy product, 3,9-bis[2-{3-3-tert-butyl-4-hydroxy-5-isopropylphenyl)proprionyloxy}-1,1-dimethylethyl]-2,4,8,10-tetraoxaspiro[5.5]undecane (Compound I-2).

m.p. 47°–57° C.

Elementary analysis (for $C_{47}H_{72}O_{10}$): Found: C, 70.93%; H, 9.41%. Calculated: C, 70.82%; H, 9.10%.

Mass analytical value (FD-mass): Molecular ion peak 796.

Proton NMR (CDCl$_3$/TMS): δ(ppm) 0.91(12H s), 1.26(12H d), 1.40(18H s), 2.7(10H m), 3.4(8H m), 3.92(4H s), 4.19(2H s), 4.73(2H broad s), 6.91(2H broad s), 6.93(2H broad s).

PRODUCTION EXAMPLE 3

(Compound AO-1)

A mixture of 35.3 g (0.121 mole) of methyl 3-(3,5-di-tert-butyl-4-hydroxyphenyl)propionate, 15.3 g (0.0503 mole of 3,9-bis(2-hydroxy-1,1-dimethylethyl)-2,4,8,10-tetraoxaspiro[5.5]undecane and 0.82 g (0.015 mole) of sodium methoxide was reacted, after-treated and purified in the same manner as in Production example 1 to obtain 21 g of a 99%-purity white crystal, 3,9-bis[2-{3-(3,5-di-tert-butyl-4-hydroxyphenyl)propionyloxy}-1,1-dimethylethyl]-2,4,8,10-tetraoxaspiro[5.5]undecane (Compound AO-1).

m.p. 98°–100° C.

Elementary analysis (for $C_{49}H_{76}O_{10}$): Found C, 71.76%; H, 9.63%. Calculated C, 71.33%; H, 9.28%.

Mass analytical value (FD-mass): Molecular ion peak 824.

Proton NMR (CDCl$_3$/TMS): δ(ppm) 0.91(12H s), 1.42(36H s), 2.7(8H m), 3.4(8H m), 3.93(4H s), 4.21(2H s), 5.05(2H broad s), 6.97(4H broad s).

EXAMPLE 1

The following blend was mixed on a mixer for 5 minutes and then melt-kneaded at 180° C. on a mixing roll to obtain a compound. This compound was formed into a sheet of 1 mm in thickness on a hot press kept at 210° C. to prepare a test piece of 40×40×1 mm in size. This test piece was placed in a Geer oven kept at 160° C. and measured for a period of time required for 30% of its area to become brittle. This period of time was taken as a thermal brittleness induction period and used for evaluation of the thermal and oxidation stability.

| Compounding: | Part by weight |
| --- | --- |
| Unstabilized polypropylene resin | 100 |
| Calcium stearate | 0.1 |
| Test compound | variable |

Also, a test piece prepared in the same manner as above was tested for thermal discoloration in a Geer oven kept at 160° C. The thermal discoloration was evaluated by a color difference, ΔYI, between the test piece above and the antioxidant-free test piece before the thermal ageing. The result is shown in Table 4.

Hereupon, the symbols of test compound in Table 4 show the following compounds:

TABLE 3

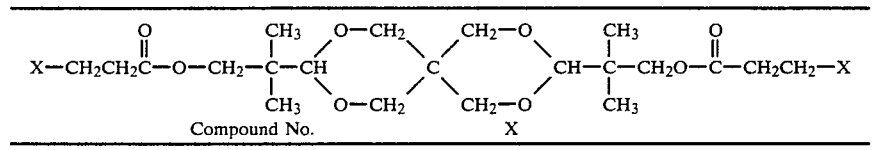

| Compound No. | X |
| --- | --- |
| I-1 | 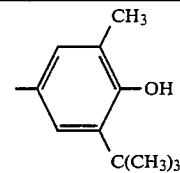 |
| I-2 | 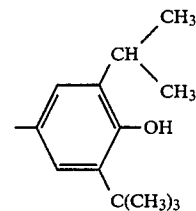 |
| AO-1 | 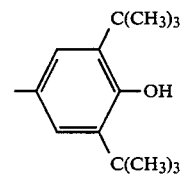 |

AO-2: Pentaerythritol tetrakis[3-(3,5-di-tert-butyl-4-hydroxy-phenyl)propionate]
AO-3: Pentaerythritol tetrakis[3-(3-tert-butyl-4-hydroxy-5-methylphenyl)propionate]
AO-4: 1,3,5-Tris(2,6-dimethyl-4-tert-butyl-3-hydroxybenzyl)-isocyanulate
AO-5: Dilauryl thiodipropionate
AO-6: Distearyl thiodipropionate

TABLE 4

| Example | No. | Phenol type stabilizer Kind | Part by weight | Sulfur type stabilizer Kind | Part by weight | Thermal brittleness induction period (H) | ΔYI 0 (H) | ΔYI 48 (H) | ΔYI 504 (H) |
|---|---|---|---|---|---|---|---|---|---|
| Present Example | 1 | I-1 | 0.05 | II-1-1 | 0.2 | 1620 | −1.6 | −15.6 | −7.5 |
|  | 2 | " | " | II-1-2 | 0.1 | 1460 | −1.3 | −14.7 | −5.5 |
|  | 3 | " | " | " | 0.2 | 1870 | −1.9 | −16.3 | −8.5 |
|  | 4 | " | " | " | 0.3 | 2300 | −1.9 | −16.4 | −8.5 |
|  | 5 | " | " | II-1-3 | 0.2 | 1650 | −1.8 | −16.0 | −8.1 |
|  | 6 | " | " | II-2-1 | " | 1640 | −1.6 | −15.8 | −7.0 |
|  | 7 | " | " | II-2-2 | " | 1670 | −1.6 | −15.8 | −7.2 |
|  | 8 | " | " | II-2-3 | " | 1790 | −1.7 | −16.0 | −8.0 |
|  | 9 | " | " | II-2-4 | " | 1860 | −1.9 | −16.2 | −8.4 |
|  | 10 | " | " | II-2-5 | " | 1790 | −1.7 | −15.9 | −8.0 |
|  | 11 | " | " | II-2-6 | " | 1850 | −1.8 | −16.0 | −8.2 |
|  | 12 | I-2 | " | II-1-2 | " | 1850 | −1.8 | −16.2 | −8.3 |
|  | 13 | " | " | II-2-4 | " | 1840 | −1.8 | −16.1 | −8.2 |
|  | 14 | " | " | II-2-5 | " | 1760 | −1.6 | −15.7 | −7.9 |
| Comparative example | 15 | I-1 | " | AO-5 | " | 400 | −1.0 | −11.1 | — |
|  | 16 | " | " | AO-6 | " | 580 | −1.2 | −11.4 | 1.4 |
|  | 17 | I-2 | " | AO-5 | " | 370 | −1.0 | −11.0 | — |
|  | 18 | " | " | AO-6 | " | 440 | −1.1 | −11.3 | — |
|  | 19 | AO-1 | " | II-1-2 | " | 310 | −0.9 | −10.8 | — |
|  | 20 | " | " | II-2-4 | " | 300 | −1.0 | −10.9 | — |
|  | 21 | " | " | AO-5 | " | 340 | −0.9 | −10.7 | — |
|  | 22 | " | " | AO-6 | " | 390 | −1.1 | −11.0 | — |
|  | 23 | AO-2 | " | II-1-2 | " | 400 | −1.0 | −12.9 | — |
|  | 24 | " | " | II-2-4 | " | 440 | −1.2 | −13.1 | — |
|  | 25 | " | " | AO-5 | " | 450 | −1.3 | −13.2 | — |
|  | 26 | " | " | AO-6 | " | 750 | −1.3 | −13.8 | 1.5 |
|  | 27 | AO-3 | " | II-1-2 | " | 1600 | −1.5 | −14.7 | −1.7 |
|  | 28 | " | " | II-2-4 | " | 1580 | −1.5 | −14.5 | −1.5 |
|  | 29 | " | " | AO-5 | " | 460 | −1.4 | −14.0 | — |
|  | 30 | " | " | AO-6 | " | 620 | −1.4 | −14.1 | 2.1 |
|  | 31 | AO-4 | " | II-1-2 | " | 1200 | 0.5 | −7.5 | 3.7 |
|  | 32 | " | " | II-2-4 | " | 1150 | 1.0 | −6.7 | 4.5 |
|  | 33 | " | " | AO-5 | " | 430 | 1.2 | −5.3 | — |
|  | 34 | " | " | AO-6 | " | 590 | 0.8 | −5.1 | 12.2 |
|  | 35 | — | — | — | — | 5 | 0.0 | — | — |

EXAMPLE 2

The test compound in Table 5 was bead-peptized together with an anionic surface active agent to prepare a suspension, and a prescribed amount, as shown in Table 5, of the suspension was added to a graft ABS latex. The mixture was, as usual, salted out with an aqueous magnesium sulfate solution, filtered, washed with water and dried to obtain an ABS resin powder which is a test sample. The thermal and oxidation stability of the ABS resin powder was evaluated by the methods described below. The result is shown in Table 5.

1. The degree of discoloration of the ABS resin powder after thermal ageing in a 180° C. Geer oven was observed.
2. The oxygen absorption induction period (I.P.) in a 170° C. oxygen atmosphere was measured using an oxygen absorption induction period measurement apparatus.
3. The ABS resin powder was repeatedly extruded on a small extruder (screw: $D=20$ mm$\phi$, $L/D=25$; strand die: $D=3$ mm$\phi$, $L/D=10$) under the following condition. The degree of discoloration of the ABS pellet after the 4th extrusion was evaluated by a color difference, ΔYI, between said ABS pellet and the antioxidant-free ABS pellet after 1st extrusion.

| Extrusion condition: | | | | |
|---|---|---|---|---|
| Number of revolution: 40 rpm | | | | |
| Temperature: | $C_1$ 220° C. | $C_2$ 240° C. | $C_3$ 260° C. | D 280° C. |

4. The ABS pellet after 4th extrusion obtained by the method in 3 above was compression-molded under a condition of 180° C.×10 min. to prepare No. 1 test piece specified by JIS K 7111. Thereafter, the Charpy impact test was carried out according to JIS K 7111 using a Charpy impact tester. In Table 5, AO-7 shows the following compound: AO-7 : 2,6-Di-tert-butyl-4-methylphenol.

TABLE 5

| Test compound | Present example | | | | | | | | |
|---|---|---|---|---|---|---|---|---|---|
|  | 1 | 2 | 3 | 4 | 5 | 6 | 7 | 8 | 9 |
| Phenol type stabilizer | | | | | | | | | |
| I-1 | 0.5 | 0.5 | 0.5 | 0.5 | 0.5 | 0.5 | | | |
| I-2 | | | | | | | 0.5 | 0.5 | 0.5 |
| AO-1 | | | | | | | | | |
| AO-2 | | | | | | | | | |
| AO-7 | | | | | | | | | |
| Sulfur type stabilizer | | | | | | | | | |

TABLE 5-continued

| | | | | | | | | | |
|---|---|---|---|---|---|---|---|---|---|
| II-1-2 | 0.5 | 1.0 | | | | | 0.5 | | |
| II-2-4 | | | 0.5 | 1.0 | | | | 0.5 | |
| II-2-5 | | | | | 0.5 | 1.0 | | | 0.5 |
| AO-5 | | | | | | | | | |
| Degree of discoloration | | | | | | | | | |
| After 30 min | Pale yellow | Pale yellow | Pale yellow | Pale yellow | Pale yellow | Pale yellow | Pale yellow | Pale yellow | Pale yellow |
| After 60 min | Yellowish brown | Yellowish brown | Yellowish brown | Yellowish brown | Yellowish brown | Yellowish brown | Yellowish brown | Yellowish brown | Yellowish brown |
| I.P. (min) | 215 | 270 | 210 | 260 | 215 | 265 | 210 | 205 | 210 |
| ΔYI | 10.9 | 10.3 | 11.0 | 10.6 | 10.8 | 10.4 | 11.0 | 11.3 | 11.0 |
| Value of Charpy impact test (Kgf · cm/cm) | 21.3 | 21.8 | 20.5 | 21.1 | 20.8 | 21.3 | 21.1 | 21.6 | 20.3 |

| | Comparative example | | | | | | | | |
|---|---|---|---|---|---|---|---|---|---|
| Test compound | 10 | 11 | 12 | 13 | 14 | 15 | 16 | 17 | 18 |
| Phenol type stabilizer | | | | | | | | | |
| I-1 | 0.5 | | | | | | | | |
| I-2 | | 0.5 | | | | | | | |
| AO-1 | | | 0.5 | 0.5 | 0.5 | 0.5 | 0.5 | | |
| AO-2 | | | | | | | | 0.5 | 0.5 |
| AO-7 | | | | | | | | | |
| Sulfur type stabilizer | | | | | | | | | |
| II-1-2 | | | 0.5 | 1.0 | | | | 0.5 | 1.0 |
| II-2-4 | | | | | 0.5 | | | | |
| II-2-5 | | | | | | 0.5 | | | |
| AO-5 | 0.5 | 0.5 | | | | | 0.5 | | |
| Degree of discoloration | | | | | | | | | |
| After 30 min | Yellowish brown | Yellowish brown | Yellowish brown | Yellowish brown | Yellowish brown | Yellowish brown | Yellowish brown | Yellowish brown | Yellowish brown |
| After 60 min | Brown | Brown | Brown | Brown | Brown | Brown | Brown | Brown | Brown |
| I.P. (min) | 145 | 140 | 130 | 140 | 130 | 130 | 130 | 145 | 155 |
| ΔYI | 14.2 | 14.6 | 15.5 | 15.6 | 15.3 | 15.5 | 15.7 | 14.5 | 14.7 |
| Value of Charpy impact test (Kgf · cm/cm) | 11.8 | 11.4 | 11.1 | 12.2 | 11.0 | 11.0 | 10.8 | 11.7 | 12.9 |

| | Comparative example | | | | | | | | | |
|---|---|---|---|---|---|---|---|---|---|---|
| Test compound | 19 | 20 | 21 | 22 | 23 | 24 | 25 | 26 | 27 | 28 |
| Phenol type stabilizer | | | | | | | | | | |
| I-1 | | | | | | | | | | No addition |
| I-2 | | | | | | | | | | |
| AO-1 | | | | | | | | | | |
| AO-2 | 0.5 | 0.5 | 0.5 | 0.5 | 0.5 | | | | | |
| AO-7 | | | | | | 0.5 | 0.5 | 0.5 | 0.5 | |
| Sulfur type stabilizer | | | | | | | | | | |
| II-1-2 | | | | | | 0.5 | | | | |
| II-2-4 | 0.5 | | | | | | 0.5 | | | |
| II-2-5 | | 0.5 | 1.0 | | | | | 0.5 | | |
| AO-5 | | | | 0.5 | 1.0 | | | | 0.5 | |
| Degree of discoloration | | | | | | | | | | |
| After 30 min | Yellowish brown | Yellowish brown | Yellowish brown | Yellowish brown | Yellowish brown | Deep brown | Deep brown | Deep brown | Deep brown | Deep brown |
| After 60 min | Brown | Brown | Brown | Brown | Brown | Blackish brown | Blackish brown | Blackish brown | Blackish brown | Blackish brown |
| I.P. (min) | 145 | 145 | 155 | 145 | 155 | 150 | 150 | 150 | 140 | 10 |
| ΔYI | 14.3 | 14.5 | 14.8 | 14.6 | 14.9 | 14.5 | 14.6 | 14.8 | 15.0 | 15.9 |
| Value of Charpy impact test (Kgf · cm/cm) | 11.6 | 11.6 | 13.0 | 11.4 | 13.5 | 12.4 | 12.5 | 12.4 | 11.7 | 7.2 |

Note: The amount added is the weight of the test compound (converted to solid basis) per 100 parts by weight of the solid matter of the resin.

What is claimed is:

1. A stabilizer for synthetic resins containing as an effective component a mixture comprising a phenol type compound (I) represented by the formula (I), (I)

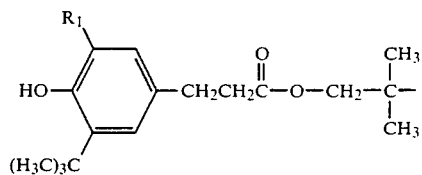

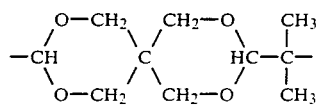

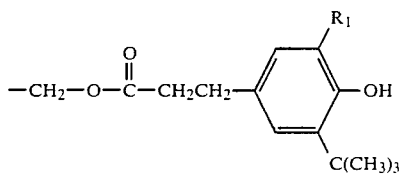

wherein $R_1$ represents a $C_1$–$C_3$ alkyl group, and at least one sulfur type compound (II) selected from the group consisting of compounds represented by the formula (II-1),

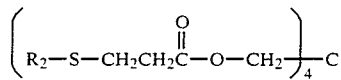
(II-1)

wherein $R_2$ represents a $C_4$–$C_{20}$ alkyl group, and compounds represented by the formula (II-2),

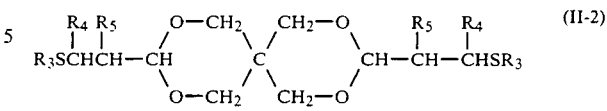
(II-2)

wherein $R_3$ represents a $C_3$–$C_{18}$ alkyl group, and $R_4$ and $R_5$ independently represent a hydrogen atom or a $C_1$–$C_6$ alkyl group, the weight ratio of phenol type compound (I) to sulfur type one (II) being 1 to 0.5–15.

2. A stabilizer for synthetic resins as described in claim 1, wherein the phenol type compound (I) is 3,9-bis[2-{3-(3-tert-butyl-4-hydroxy-5-methylphenyl)propionyloxy}-1,1-dimethylethyl]-2,4,8,10-tetraoxaspiro[5.5]undecane.

3. A stabilizer for synthetic resins as described in claim 1, wherein the sulfur type compound (II-1) is tetrakis(3-dodecylthiopropionyloxymethyl)methane.

4. A stabilizer for synthetic resins as described in claim 1, wherein the sulfur type compound (II-2) is 3,9-bis(2-dodecylthioethyl)-2,4,8,10-tetraoxaspiro[5.5]undecane.

5. A stabilizer for synthetic resins as described in claim 1, wherein the sulfur type compound (II-2) is 3,9-bis(2-octadecylthiopropyl)-2,4,8,10-tetraoxaspiro[5.5]undecane.

6. A stabilizer for synthetic resins as described in claim 1, wherein the synthetic resin is a polyolefin resin.

7. A stabilizer for synthetic resins as described in claim 6, wherein the polyolefin resin is polypropylene.

* * * * *